US007610664B2

(12) United States Patent
Wridt et al.

(10) Patent No.: US 7,610,664 B2

(45) Date of Patent: Nov. 3, 2009

(54) JOINT PRESS SET

(75) Inventors: Gerald A. Wridt, Racine, WI (US); Daniel D. Lionberg, Milwaukee, WI (US); Thomas J. Whalen, Pleasant Prairie, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 11/443,926

(22) Filed: May 31, 2006

(65) Prior Publication Data

US 2006/0242810 A1 Nov. 2, 2006

Related U.S. Application Data

(62) Division of application No. 10/950,066, filed on Sep. 24, 2004.

(51) Int. Cl.
*B23P 19/02* (2006.01)

(52) U.S. Cl. .......................... 29/257; 29/278; 269/249; 269/143

(58) Field of Classification Search .................. 29/257, 29/255, 263, 278; 81/120, 121.1; 269/249, 269/143
See application file for complete search history.

(56) References Cited

U.S. PATENT DOCUMENTS 1,498,638 A * 6/1924 Periolat ....................... 269/47
2,078,631 A * 4/1937 Gagne ......................... 403/17
3,102,333 A 9/1963 Thorton et al.
3,237,291 A 3/1966 Kelso
3,651,553 A 3/1972 Dodd
3,696,496 A 10/1972 Corder
3,745,637 A 7/1973 Rutherford et al.
3,786,544 A 1/1974 Ferguson
3,791,006 A 2/1974 Robinson
3,862,483 A 1/1975 Kloster
3,942,234 A 3/1976 Kepler
4,120,082 A 10/1978 Bond
4,535,658 A * 8/1985 Molinari .................. 81/177.85
4,558,502 A 12/1985 Gossmann et al.
4,570,319 A 2/1986 Skoworodko
4,649,615 A 3/1987 Hundley
4,658,488 A 4/1987 Johnstead
4,977,660 A 12/1990 Maynard
5,343,786 A * 9/1994 Wridt .......................... 81/438
5,490,432 A 2/1996 Allard et al.
5,568,757 A * 10/1996 Lewis ........................ 81/177.2
5,595,099 A * 1/1997 Pusateri .................. 81/177.85
5,781,977 A 7/1998 Servones
5,836,078 A 11/1998 Aiken et al.
5,857,252 A * 1/1999 Jansen ......................... 29/257
6,035,533 A 3/2000 Warnke et al.
6,131,262 A 10/2000 Freimann
2006/0070221 A1* 4/2006 Wridt et al. ................ 29/281.1

* cited by examiner

*Primary Examiner*—Lee D Wilson
(74) *Attorney, Agent, or Firm*—Seyfarth Shaw, LLP

(57) ABSTRACT

A joint press including a yoke including a first end and a second end. A first adapter attachment member is positioned on the first end. A second adapter attachment member is positioned on the second end. The first adapter attachment member and the second adapter attachment member have the same profile, thereby allowing the same adapter to be removably connected to either the first end or the second end.

9 Claims, 3 Drawing Sheets

JOINT PRESS SET

REFERENCE TO RELATED APPLICATION

This is a division of copending U.S. patent application Ser. No. 10/950,066, filed Sep. 24, 2004.

BACKGROUND

People who service automobiles use joint press kits to install and remove joints, such as press-in ball joints and universal joints, of vehicle suspensions. A joint press kit often includes several adapters. The adapters typically fall into two categories. "Push" adapters bear against joints to drive them in a particular direction, e.g. into or out of a vehicle suspension, while "receiver" adapters bear against the vehicle suspension and receive a joint as it is pushed. Thus, the push adapter and the receive adapter cooperate to force the joint either into or out of a vehicle suspension.

Adapters are typically made to service a particular type of joint. The size and the shape of an adapter are tailored to the characteristics of the joint that it is meant to service. For example, a narrow ball joint requires a correspondingly narrow push adapter and can operate effectively with a wide number of receive adapters provided they are wider than the joint. There are many different sizes and shapes of ball joints. Accordingly, for a joint press kit to provide comprehensive coverage, it must include a correspondingly large number of adapters.

This presents a problem, however, because as the number of ball joint types increase, the cost of providing a larger number of adapters becomes prohibitive from a cost, time, and storage standpoint. Further, despite having a large number of adapters, the press kit might still not cover all the possible ball joints. Accordingly, what is needed is a joint press kit in which the number of adapters is optimized to provide the broadest possible coverage of the ball joints on the market.

A second difficulty with joint press kits is they are not adaptable for use in a wide variety of vehicles. One make of vehicle may require installation of an upper ball joint by providing downward force, whereas another vehicle may require upward force. Therefore, what is needed is a joint press kit that may be used in many different configurations.

A third difficulty with joint press kits is they do not provide an accommodation for the grease fitting during the removal and installation of ball joints. The grease fitting is located on the side opposite the stem side of a ball joint. The grease fitting can not be present during installation and removal operations because it will interfere with the operation of the joint press. Thus, prior to removal of a ball joint, the grease fitting must be removed. Further, during installation of a ball joint, the grease fitting can only be added after the ball joint is securely placed in the suspension. These operations are often difficult to perform. Accordingly, there is a need for a joint press that allows a user to install or remove a ball joint while the grease fitting is in place.

A fourth difficulty with joint press kits is that the adapters do not always attach to the press easily or effectively. For example, if a kit requires that the adapters be screwed onto the pressure screw, this consumes valuable time. On the other hand, if the adapters can attach to the pressure screw quickly, they might not be effectively secured. Therefore, what is needed is a device for efficiently and effectively attaching ball joint adapters to the press.

A fifth problem with ball joint kits relates to the length of the adapters. Often, it may be desirable to use an adapter having a particular width to perform a removal or an installation operation. Yet, if the adapter is not long enough to bear against the vehicle suspension it is unusable. Therefore, what is needed is an adapter extension to impart usefulness to otherwise unusable adapters.

SUMMARY

In one embodiment, a joint press is provided. The joint press includes a yoke having a first end and a second end. A first adapter attachment member is positioned on the first end. A second adapter attachment member is positioned on the second end. The first adapter attachment member and the second adapter attachment member have the same profile, thereby allowing the same adapter to be removably connected to either the first end or the second end.

In another embodiment, a joint press is provided. The joint press includes a yoke having a first end and a second end. A first attachment member is located on the first end. A second attachment member is located on the second end. At least one adapter is provided that can be removably coupled to either the first attachment member or the second attachment member.

In a further embodiment, a joint press is provided. The joint press includes a yoke having a first end and a second end. A first adapter attachment member is positioned on the first end. A second adapter attachment member is positioned on the second end. Plural adapters are provided, each having a first end adapted to receive a joint and a second end that is adapted to be attached to either the first attachment member or the second attachment member.

In yet another embodiment, a device for attaching an adapter to a joint press is provided. The device includes a sleeve having an interior surface and an exterior surface, wherein the sleeve is part of the adapter. An interior groove is positioned on the interior surface of the sleeve. A snap-ring having a transverse circular cross-section is positioned in the interior groove. The snap-ring floats within the groove. A shaft having an exterior surface is part of the joint press. An exterior groove is positioned on the exterior surface of the shaft. The snap ring engages the exterior groove when the shaft and the sleeve are mated.

In a further embodiment, a pressure pad for a ball joint press is provided. The pressure pad includes a shaft and an engagement portion attached to the shaft. The engagement portion includes a recess that is adapted to receive a ball joint grease fitting.

DETAILED DESCRIPTION

Figure 1:
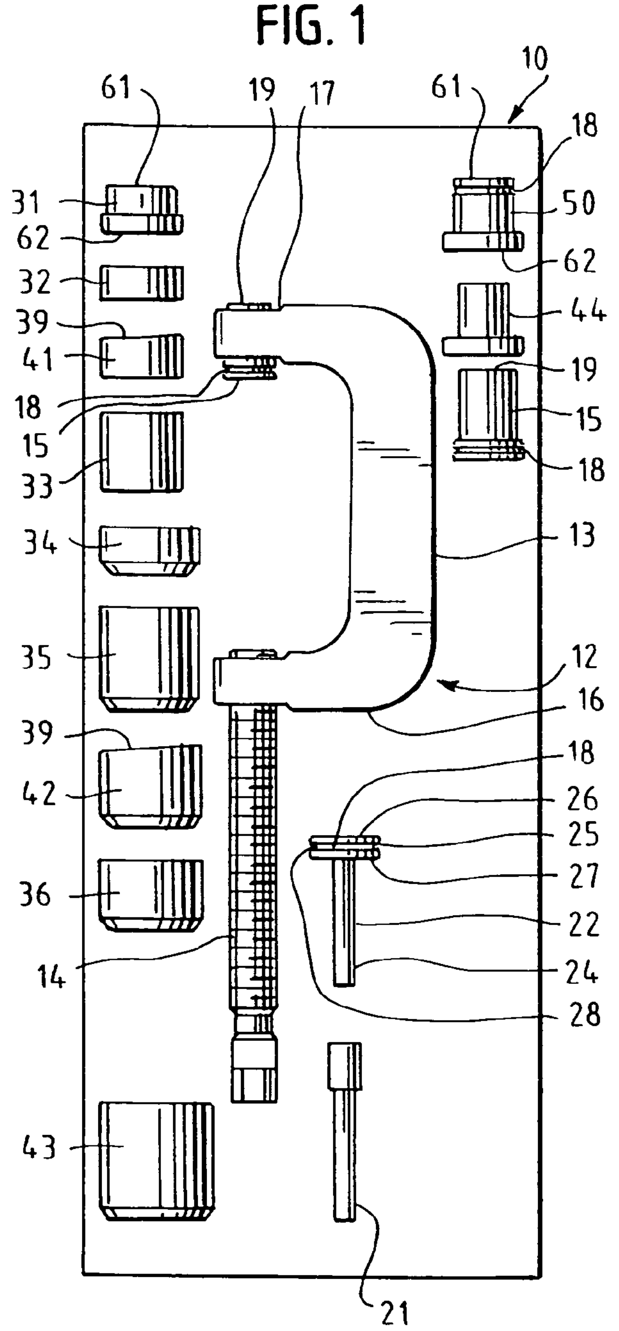
FIG. 1 is a side elevation view of joint press kit including a press, a plurality of pressure pads, and a plurality of adapters.

Referring to FIG. 1, a joint press kit 10 in one example comprises a press 12, a universal joint pressure pad 21, a ball joint pressure pad 22, a plurality of dual-use adapters 31, 32, 33, 34, 35, 36, a plurality of single-use adapters 41, 42, 43, 44, and an adapter extension 50. The components of the joint press kit 10 can be made of any material suitable for performing its intended function of installing and removing joints from vehicle suspensions. Exemplary materials include, but are not limited to alloy steels such as SAE 4140, SAE 8640, SAE 52100, and music wire.

Press 12, in one example, comprises a yoke 13, a pressure screw 14, and an adapter attachment shaft 15. Pressure screw 14 is positioned in a threaded opening (see FIG. 2) located at a first end 16 of yoke 13. Adapter attachment shaft 15 is positioned in an opening (see FIG. 2) located at a second end 17 of yoke 13.

Pressure screw 14 is at least partially hollow and includes an opening on one end. As will be discussed further herein, either of pressure pads 21, 22 (see FIG. 2) can be inserted into an opening located at an end of pressure screw 14. Pressure pads 21, 22 can then be utilized for installation and removal operations for universal joint bearing caps and ball joints, respectively.

Adapter attachment shaft 15 and pressure pad 22 act as adapter attachment members to which the various adapters can be connected to perform an installation or removal operation. Adapter attachment shaft 15 and pressure pad 22 both include an external circumferential groove 18. External groove 18 mates with a corresponding internal circumferential groove, containing a snap-ring, which is located within each adapter to attach the adapter to either shaft 15 or pressure pad 22. Alternatively, other means, such as friction fits or various threaded configurations, could be used to attach the adapters to attachment shaft 15 or pressure pad 22. The connection between these parts is discussed further herein.

Adapter attachment shaft 15, for exemplary purposes, is shown both positioned in the opening at end 17 of yoke 13 and to the side of yoke 13. Adapter attachment shaft 15 is connected to yoke 13 by placing end 19 into the opening on end 17 of yoke 13. Adapter attachment shaft 15 could be secured to yoke 13 through a variety of means. For example, shaft 15 could have an external groove that mates with an internal groove and snap-ring located in yoke 15. Alternatively, another means, such as a friction fit or threaded engagement could be used. Adapter attachment shaft 15 is at least partially hollow and in the illustrated embodiment is tubular to allow a ball joint stud to pass within it during a removal or installation operation.

Ball joint pressure pad 22 includes a shaft 24 and an engagement portion 25. The engagement portion 25 is cylindrical and includes a first base surface 26, a second base surface 27, and a sidewall 28. External groove 18 is located on the sidewall 28 of engagement portion 25. Base surface 26 in one example is flat and can be utilized to engage a ball joint. Base surface 27 is connected to shaft 22.

The dual-use adapters 31-36 are designed to function as both “push” adapters and “receive” adapters. Single-use adapters 41-44 are designed to perform only one function, either pushing or receiving. Each of the adapters has a first end 61 for engaging a joint, either through pushing or receiving, and a second end 62 that connects to adapter attachment shaft 15 or to pressure pad 22. Adapters 31-36 and adapters 43, 44 are basic cylindrical adapters. Adapters 41, 42 include have an angled surface 39 at end 61 for engaging an angled suspension member.

Adapter extension 50, as will be discussed herein, is stackable with respect to the other adapters. Thus, adapter extension 50 can increase the effective length of the other adapters. Adapter extension 50 includes external groove 18 for mating with the snap ring the other adapters.

In another example, a common grease fitting that installs by way of threaded interface, is installed in a radially drilled hole in the yoke 13 generally at the end 16 that includes the internally threaded opening in which the pressure screw 14 is positioned. The threaded bore in which the grease fitting mounts begins at a location on the yoke 13 such that when the grease fitting is installed it is not prone to being damaged by contact with external objects during use. This bore continues through the solid forging of the yoke 13, breaking into the larger, internally threaded pressure screw bore mentioned above.

Figure 2:
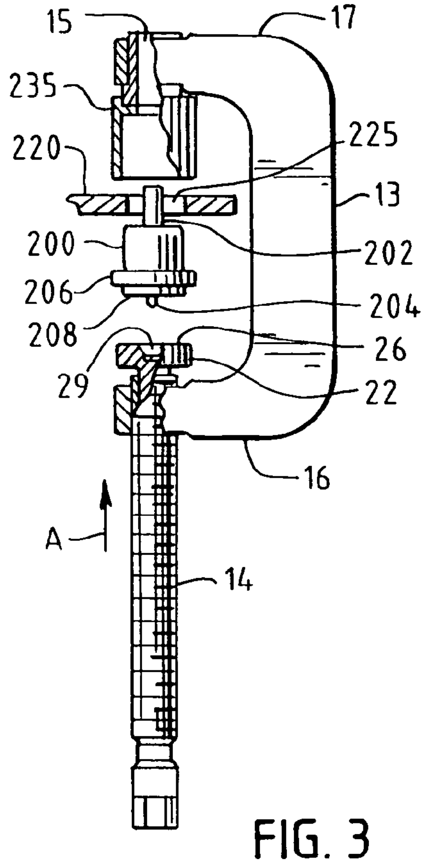
FIG. 2 is a side elevation view of the joint press kit of FIG. 1 shown partially cut away and in an exemplary configuration operable to insert a ball joint into a suspension.
Figure 3:
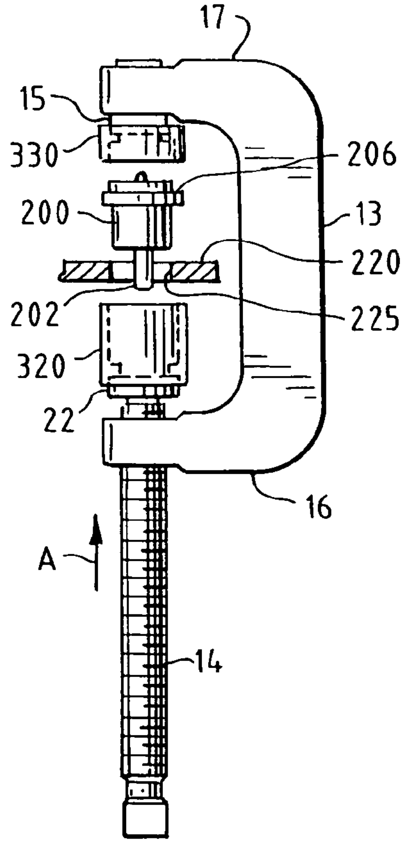
FIG. 3 is a side elevation view of the joint press kit of FIG. 1 shown in another exemplary configuration for installing a ball joint into a suspension.
Figure 4:
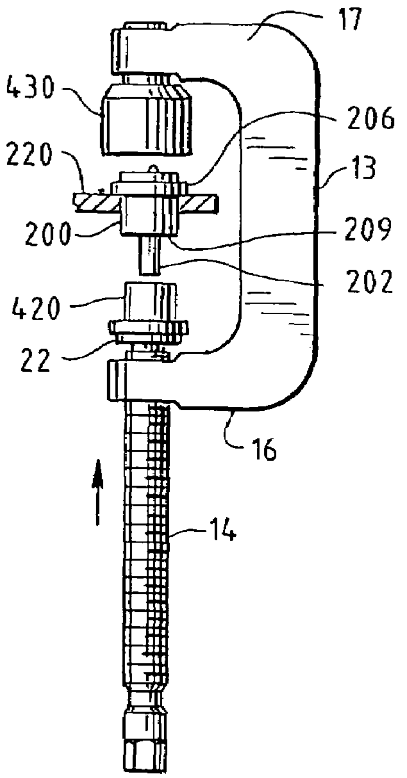
FIG. 4 is side elevation view of the joint press of FIG. 1 shown in an exemplary configuration for removing a ball joint.

Referring to FIGS. 2-4, a typical ball joint 200 includes a stem 202, a grease fitting 204, a flange 206, and a surface 208 against which pressure pad 22 can push. The ball joint 200 is typically installed into an opening in a portion of an automobile suspension (e.g. control arm, axle, knuckle, etc.). FIGS. 2-4 depict this portion of the automobile suspension as item 220 and the opening as 225.

Ball joints typically install either in the direction of the stem 202 or in a direction opposite the stem 202. FIGS. 2-4 depict a ball joint 200 that is installed in the stemwise direction and removed in the counterstemwise direction.

For brevity, the drawing depicts press kit 10 in operations with a ball joint that installs in the stemwise direction. As those with skill in the art would understand, joint press kit 10 will also function with ball joints that install in the counterstemwise direction.

Referring now to FIG. 2, in one example, the joint press kit 10 is configured to install ball joint 200 into the suspension 220, by positioning the pressure screw 14 and ball joint pressure pad 22 on the side of ball joint 200 that grease fitting 204 is located on. In the operation depicted in FIG. 2, pressure pad 22 is used to push ball joint 220. If necessary, an adapter could be placed on pressure pad 22.

Figure 6:
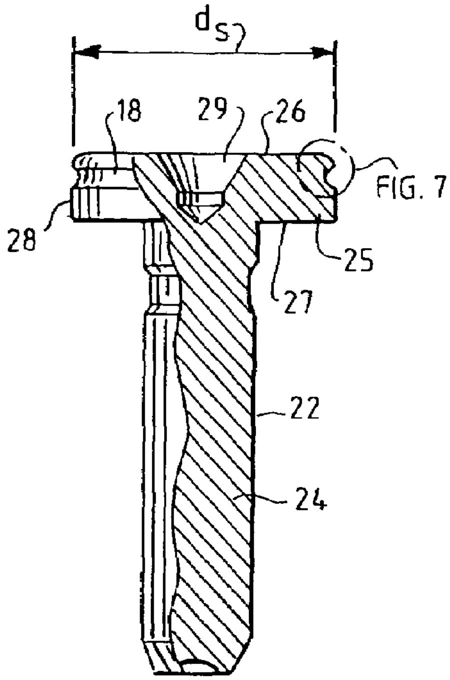
FIG. 6 is an enlarged cut away view of the ball joint pressure pad shown in the joint press kit of FIG. 1.

Referring to FIGS. 2 and 6, pressure pad 22 includes a recess 29 located on surface 26. Recess 29 is shaped and dimensioned to receive grease fitting 204. Accordingly, pressure pad 22 can be brought to bear against surface 208 of ball joint 200 while the grease fitting 204 is in place.

Referring now to FIG. 2, to install the ball joint, pressure pad 22 is brought to bear against surface 208 of ball joint 200. On the opposite end 17 of yoke, an adapter 235 is positioned on attachment shaft 15. Adapter 235 can be any adapter capable of acting as a receiver. Table 1 provides a list of the adapters shown in FIG. 1 and identifies each as a receiver, a pusher, or dual use. It should be noted that all of the adapters in Table 1 are adapted to fit on both receive shaft 15 and pressure pad 22.

TABLE 1

| Number | Function |
|---|---|
| 31 | Dual |
| 32 | Dual |
| 33 | Dual |
| 34 | Dual |
| 35 | Dual |
| 36 | Dual |
| 41 | Receiving |
| 42 | Receiving |
| 43 | Receiving |
| 44 | Pushing |
| 50 | Extension |

Whether an adapter is placed on pressure pad 22 depends on the geometry of the ball joint 200 and the configuration of the vehicle suspension. Similarly, the choice of adapter to place on attachment shaft 15 depends on the geometry of ball joint 200 and the configuration of the vehicle suspension. The particular mechanic performing the operation will decide after analyzing both the ball joint 200 and the suspension.

To install ball joint 200, pressure screw 14 is turned so that pressure pad 22 advances in direction A. Surface 26 of pressure pad 22 will eventually contact surface 208 of ball joint 200 and adapter 235 will bear against suspension 222. As the pressure screw 14 continues to be turned, adapter 235 will provide an opposing force against which pressure pad 22 pushes to drive ball joint 200 into opening 225. Stem 202 of ball joint will enter the bore of adapter 235. Accordingly, as will be discussed further herein the through bore of adapter 235 must be large enough to accommodate the ball joint stem 202. Ball joint 200 will stop advancing when flange 206 contacts suspension 220.

Referring to FIG. 3, an insertion operation is shown in which the orientation of yoke 13 relative to the ball joint 200 is reversed as compared to FIG. 2. This might be necessary for certain vehicles. For instance, if there is no room to apply a wrench to the end of pressure screw 14 using the configuration of FIG. 2, then the configuration of FIG. 3 might be desirable.

In FIG. 3, pressure pad 22 has a receiver 320 attached and attachment shaft 15 has a push adapter 330 attached. Once again pressure screw 14 is turned to advance adapter 320 toward suspension 220. At a certain point, adapter 320 will bear against suspension 220 while adapter 330 bears against flange 206 of ball joint 200. As pressure screw 14 turns, stem 202 of ball joint 200 will enter the bore of adapter 320 and adapters 320, 330 will squeeze ball joint 200 into opening 225.

FIG. 4 depicts a removal operation. Ball joint 200 is shown attached to suspension 220. An adapter 420 is attached to pressure pad 22 and an adapter 430 is attached to attachment shaft 15. Once again adapters 420, 430 are chosen according to the geometry of ball joint 200 and suspension 220. Adapter 420 acts as a push adapter and adapter 430 acts as a receive adapter. As pressure screw 14 turns, stem 202 enters the bore of adapter 420, and adapter 420 eventually bears against surface 209 of ball joint 200. Meanwhile, adapter 430 surrounds flange 206 of ball joint 200 and bears against suspension 220. As pressure screw 14 continues to turn, adapter 430 pushing against suspension 220 provides push adapter 420 with an opposing force against which it pushes to expel ball joint 200 from suspension 220.

Figure 5:
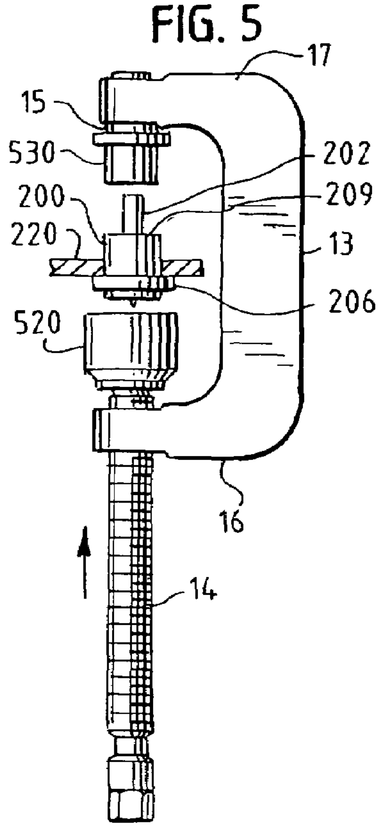
FIG. 5 is a side elevation view of the joint press of FIG. 1 shown in a second exemplary configuration for removing a ball joint.

Referring to FIG. 5, a removal operation is shown in which the orientation of yoke 13 relative to ball joint 200 is reversed. Receive adapter 520 is positioned on pressure pad 22 and push adapter 530 is positioned on attachment shaft 15. As pressure screw 14 advances adapter 520, adapter 520 surrounds flange 206 of ball joint 200 and bears against suspension 220. Meanwhile, stem 202 enters the bore of push adapter 530, which then bears against surface 209 of ball joint 200. As pressure screw 14 turns, adapter 530 pushes ball joint 200 out of suspension 220.

Referring to FIGS. 1 and 6, as was stated earlier, pressure pad 22 comprises shaft 24 and engagement portion 25. Engagement portion 25 is cylindrical and includes first base surface 26, second base surface 27, and sidewall 28. Circumferential groove 18 is positioned on sidewall 28. In addition, engagement portion 25 has outer diameter ds. In one example, end 19 of attachment shaft 15 and end 61 of adapter extension 50 include the identical profile as engagement portion 25. In other words, end 19 of attachment shaft 15 and end 61 of extension 50 are cylindrical, have the same outer diameter ds, and include circumferential groove 18 positioned on the sidewall of their cylindrical surfaces; thus, providing attachment shaft 15, pressure pad 22, and extension 50 with an identical interface for mating with the adapters. In one example ds is 1.645 inches.

Figure 8:
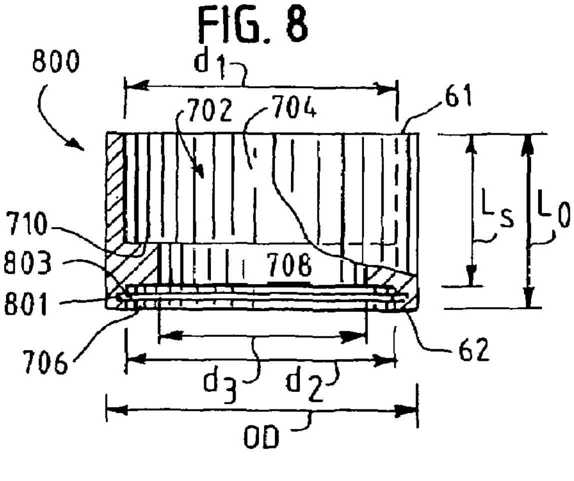
FIG. 8 is an enlarged cut away view of an exemplary joint adapter of the kit of FIG. 1.

Referring to FIG. 8, an exemplary adapter 800 is shown for illustrative purposes to describe certain features that are common to all of the adapters of FIG. 1. The characteristics of adapter 800 depend on the particular adapter of FIG. 1 that adapter 800 represents. Each adapter includes a first end 61, a second end 62, and a sleeve 63, the sleeve 63 having an interior surface 64 and an exterior surface 65. First end 61 either pushes against a ball joint or receives a ball joint. End 62 is the end that is connected to adapter attachment shaft 15, pressure pad 22, or adapter extension 50. Each adapter includes a bore 702 which runs from first end 61 to second end 62. Bore 702 includes three portions. The first portion 704 is adapted to receive or engage a ball joint. The second portion 706 is adapted to receive end 19 of attachment shaft 15, engagement portion 25 of pressure pad, and end 61 of adapter 50. Portion 708 is a through portion that communicates with portions 704 and 706. The intersection of portion 706 and portion 708 provides a ledge or ridge 710 against which adapter receive shaft 15, pressure pad 22, or extension 50 push when press kit 10 is in use.

As will be further discussed herein, second portion 706 of each adapter includes a groove 801 in which a snap ring 803 is positioned. When pressure pad attachment shaft 15, pressure pad engagement portion 25, or end 61 of extension 50 are inserted into portion 706, groove 18 mates with groove 801 and snap ring 803 engages both grooves 18, 801, thereby holding the pieces together.

First portion 704 has a diameter $d_1$. Diameter $d_1$ varies according to the particular adapter. The values of d1 are chosen so kit 10 will cover the largest number of ball joints possible. The diameter $d_1$ for each adapter shown in FIG. 1 is provided in Tables 2 and 3.

TABLE 2

| | Cylindrical Adapters | | | | | |
|---|---|---|---|---|---|---|
| ADAPTER | d1 | OD | bore depth | d3 | Ls | Lo |
| 31 | 1.680 | 1.890 | 0.650 | 1.250 | 0.830 | 1.100 |
| 32 | 1.775 | 2.000 | 0.550 | 1.250 | 0.730 | 1.000 |
| 33 | 2.010 | 2.250 | 1.700 | 1.250 | 1.880 | 2.150 |
| 34 | 2.250 | 2.500 | 0.670 | 1.250 | 0.850 | 1.120 |
| 35 | 2.250 | 2.500 | 2.300 | 1.250 | 2.480 | 2.750 |
| 36 | 2.425 | 2.750 | 1.250 | 1.250 | 1.430 | 1.700 |
| 43 | 2.680 | 2.937 | 2.300 | 1.250 | 2.480 | 2.750 |
| 44 | 0.895 | 1.330 | 1.550 | 0.895 | 1.400 | 1.820 |
| 50 | 1.250 | 1.645 | 1.780 | 1.250 | 1.650 | 2.050 |

TABLE 3

Special Shaped Adapters

| ADAPTER | d1 | OD | MAX. bore depth | d3 | Face angle | Ls | cutout or angle? | Lo |
|---|---|---|---|---|---|---|---|---|
| 41 | 1.845 | 2.000 | 0.800 | 1.250 | 4.500 | 0.980 | Angle | 1.250 |
| 42 | 2.350 | 2.650 | 1.700 | 1.250 | 4.500 | 1.880 | Angle | 2.150 |

Second portion 706 has a diameter $d_2$. Diameter $d_2$ does not vary for the respective adapters. In one example, $d_2$ is 1.656 inches for each adapter. Third portion 708 has a diameter $d_3$ that also does not vary from adapter to adapter. In one example, diameter $d_3$ is 1.25 inches, which is large enough to allow passage of the largest known ball joint stud 202 (FIGS. 2-5) to pass through the adapter. FIG. 8 also illustrates an outer diameter (OD) of adapter 800, an overall length (Lo) of adapter 800, and a stack length (Ls) of adapter. Exemplary values of these lengths for each adapter of FIG. 1 are provided in tables 2 and 3.

Figure 9:
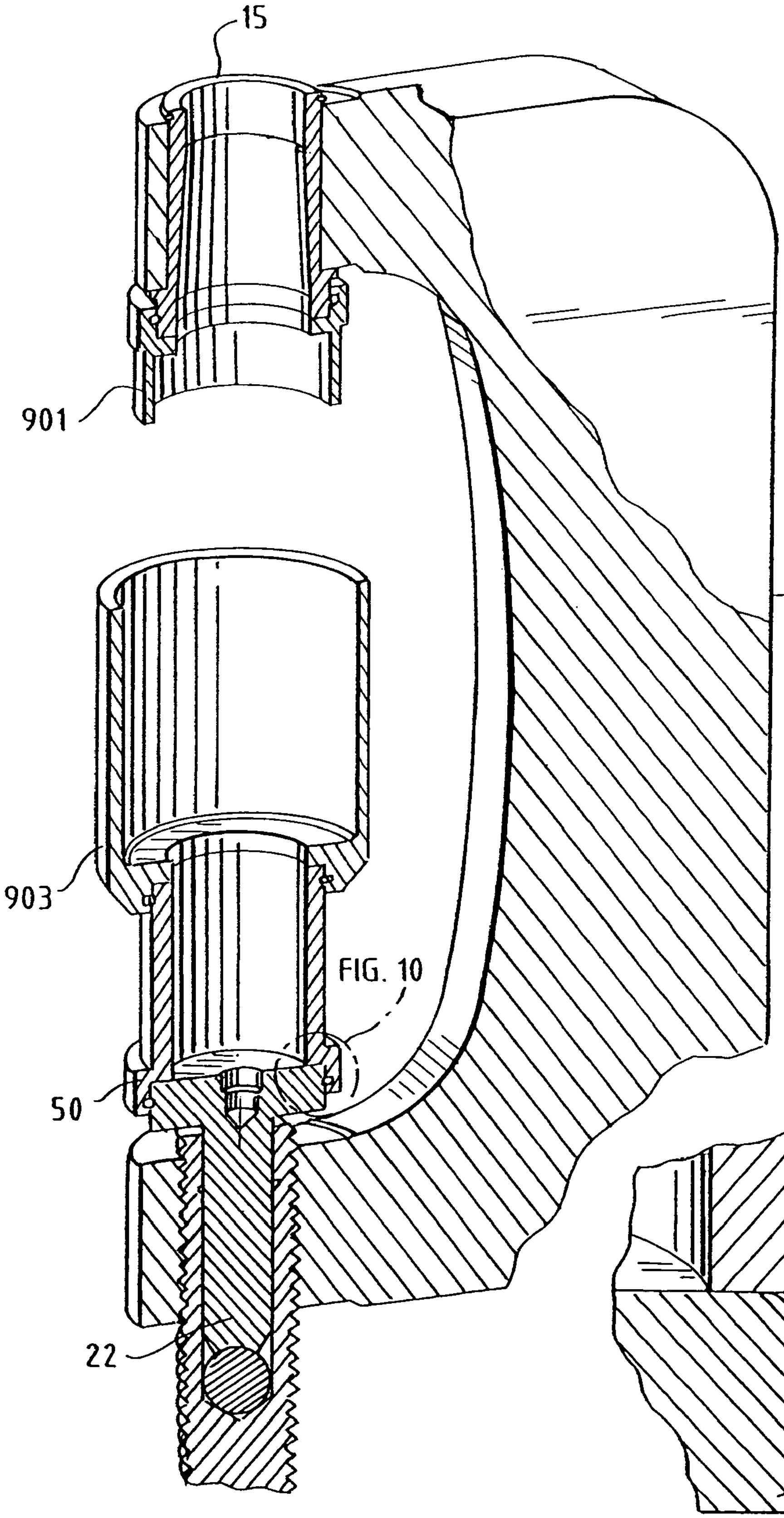
FIG. 9 is an enlarged, fragmentary, perspective view of the joint press kit of FIG. 1 shown in an exemplary configuration utilizing the adapter extension, with portions of the yoke, pressure screw, pressure pad, and adapters cut away.
Figure 10:
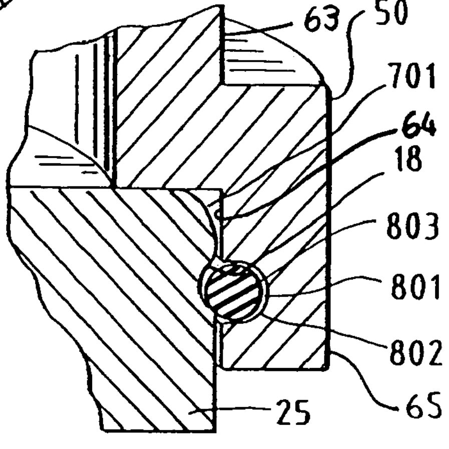
FIG. 10 is a further enlarged fragmentary view of the encircled portion of FIG. 9.

FIGS. 9-10 depict an exemplary configuration in which an adapter 901 is connected to attachment shaft 15, an adapter 903 is connected to extension 50, and extension 50 is connected to pressure pad 20 utilizing grooves 18, 801 and snap-ring 803. Referring to FIG. 10, it can be seen that the mechanism functions because snap-ring 803 is allowed to "float" within groove 803 when the pieces are not connected. By "float" it is meant that snap-ring 803 does not contact the bottom 802 of groove 801 when the piece is disconnected. Further, groove 801 has sufficient width to allow snap ring to 803 to move within groove 801. Accordingly, when shaft 15, pressure pad 22, or extension 50 are inserted into the receiving portion of the adapter, tapered portion 701 of the shaft 15 (see FIG. 7), pressure pad 22, or extension 50 abuts snap ring 803 and causes it to expand into groove 801. Eventually, as the pieces are brought closer together, snap-ring 803 will reside in both groove 18 and groove 801, thereby causing the pieces to mate. It is important that groove 801 is large enough for snap-ring 803 to float, but not large enough that snap-ring becomes off-center within the adapter. Exemplary dimensions of adapter features discussed herein are as follows: Groove 801 features a major inner diameter of 1.821", and a full-compliment radius and width of 0.088". Snap-ring 803 has an inner diameter of 1.621 and a wire gauge of 0.080"

Figure 7:
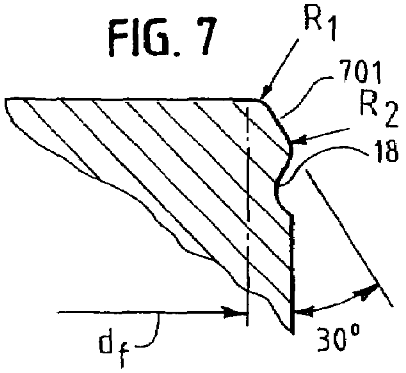
FIG. 7 is an enlarged fragmentary view of the encircled portion of the pressure pad of FIG. 6.

Referring to FIG. 7, it is also important that the groove 18 and taper 701 be formed correctly on the exterior surface of attachment shaft 15, pressure pad 25, and extension 50. In one of these examples, taper 701 is a lead-in taper of 30 degrees, formed to have a lead-in radius R1 of 0.047" beginning at diameter df of 1.514", and a lead-out radius R2 of 0.047".

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. An adapter and joint press combination comprising:

a joint press comprising a yoke having a first end and an opposing second end, the first end receiving an adapter attachment shaft, the adaptor attachment shaft having a substantially hollow interior and an exterior surface having an exterior groove positioned thereon, and the second end receiving a pressure screw, the pressure screw being at least partially hollow at a first end;

an adapter sleeve having an interior surface and an exterior surface, the interior surface of the adapter sleeve having an interior groove positioned thereon;

a snap-ring having a circular cross-section positioned in the interior groove, wherein the interior groove is greater in width than the snap-ring such that the snap-ring floats within the groove; and a pressure pad comprising a shaft and an adapter engagement portion, the adapter engagement portion comprising a first base surface connected to the shaft, a cylindrical sidewall having an exterior groove positioned thereon and a second base portion, wherein the pressure pad shaft is received within the pressure screw first end;

wherein the snap ring engages the exterior groove of either the adapter attachment shaft exterior surface or the pressure pad cylindrical sidewall when the respective exterior groove is mated with the adapter sleeve.

2. The device of claim 1, wherein the adapter sleeve has a cylindrical shape.

3. The device of claim 1, wherein the adapter has a first end adapted to receive a ball joint and a second end adapted to receive the adapter attachment shaft.

4. The device of claim 3, wherein the interior groove is located on the second end of the adapter.

5. The device of claim 4, wherein the interior groove runs along the circumference of the interior of the adapter sleeve.

6. The device of claim 5, wherein the interior groove has an inner diameter of 1.821 inch.

7. The device of claim 6, wherein the snap-ring has a width of 0.08 inch.

8. The device of claim 7, wherein the exterior groove has a width of 0.073 inch.

9. The device of claim 1, wherein the second base portion is flat.

* * * * *